(12) United States Patent
Aronson et al.

(10) Patent No.: US 7,079,775 B2
(45) Date of Patent: Jul. 18, 2006

(54) INTEGRATED MEMORY MAPPED CONTROLLER CIRCUIT FOR FIBER OPTICS TRANSCEIVER

(75) Inventors: Lewis B. Aronson, Los Altos, CA (US); Stephen G. Hosking, Santa Cruz, CA (US)

(73) Assignee: Finisar Corporation, Sunnyvale, CA (US)

( * ) Notice: Subject to any disclaimer, the term of this patent is extended or adjusted under 35 U.S.C. 154(b) by 703 days.

(21) Appl. No.: 09/777,917

(22) Filed: Feb. 5, 2001

(65) Prior Publication Data

US 2002/0149821 A1   Oct. 17, 2002

(51) Int. Cl.
   *H04B 10/00*   (2006.01)
(52) U.S. Cl. .......................... 398/137; 398/135
(58) Field of Classification Search .............. 398/135, 398/136, 137, 138, 139; 257/80; 372/38.02
   See application file for complete search history.

(56) References Cited

U.S. PATENT DOCUMENTS

| 4,545,078 A | 10/1985 | Wiedeburg .................. 398/166 |
| 4,687,924 A | 8/1987  | Galvin et al. ................ 250/216 |

(Continued)

FOREIGN PATENT DOCUMENTS

| EP | 1471671 A2 | 12/2004 |
| JP | 58140175 A | 8/1983 |
| JP | 62124576 A | 6/1987 |

(Continued)

OTHER PUBLICATIONS

N.R. Avella, "AN/ARC–144 UHF Multimode Transceiver", SIGNAL, vol. 26, No. 5, (Jan./Feb. 1972) pp. 14–15.

Hausdorf, Reiner, "Mobile Transceiver Measurements with Radiocommunication Service Monitor CMS", News From Rohde & Schwarz, 127, IV, 1989, pp. 4–7.

Mendez, J., "A Circuit to Provide Protection from Surge Voltages (for CB Transceiver)", Revista Española de Electronica, Mayo 1984, pp. 37–39.

*Primary Examiner*—Leslie Pascal
*Assistant Examiner*—Christina Y Leung
(74) *Attorney, Agent, or Firm*—Morgan, Lewis & Bockius LLP

(57) ABSTRACT

A controller for controlling a transceiver having a laser transmitter and a photodiode receiver. The controller includes memory for storing information related to the transceiver, and analog to digital conversion circuitry for receiving a plurality of analog signals from the laser transmitter and photodiode receiver, converting the received analog signals into digital values, and storing the digital values in predefined locations within the memory. Comparison logic compares one or more of these digital values with limit values, generates flag values based on the comparisons, and stores the flag values in predefined locations within the memory. Control circuitry in the controller controls the operation of the laser transmitter in accordance with one or more values stored in the memory. A serial interface is provided to enable a host device to read from and write to locations within the memory. Excluding a small number of binary input and output signals, all control and monitoring functions of the transceiver are mapped to unique memory mapped locations within the controller. A plurality of the control functions and a plurality of the monitoring functions of the controller are exercised by a host computer by accessing corresponding memory mapped locations within the controller.

77 Claims, 3 Drawing Sheets

U.S. PATENT DOCUMENTS

| | | | |
|---|---|---|---|
| 4,734,914 A | 3/1988 | Yoshikawa | 372/33 |
| 4,747,091 A | 5/1988 | Doi | 369/116 |
| 5,019,769 A | 5/1991 | Levinson | 372/31 |
| 5,039,194 A | 8/1991 | Block et al. | 385/88 |
| 5,047,835 A | 9/1991 | Chang | 257/433 |
| 5,057,932 A | 10/1991 | Lang | 386/101 |
| 5,334,826 A | 8/1994 | Sato et al. | 235/455 |
| 5,383,208 A | 1/1995 | Queniat et al. | 372/29 |
| 5,392,273 A | 2/1995 | Masaki et al. | 369/106 |
| 5,396,059 A | 3/1995 | Yeates | 250/214 C |
| 5,448,629 A | 9/1995 | Bosch et al. | 359/187 |
| 5,510,924 A | 4/1996 | Terui et al. | 359/143 |
| 5,557,437 A | 9/1996 | Sakai et al. | 398/9 |
| 5,574,435 A | 11/1996 | Mochizuki | 340/638 |
| 5,673,282 A | 9/1997 | Wurst | 372/38 |
| 5,812,572 A | 9/1998 | King et al. | 372/38 |
| 5,822,099 A | 10/1998 | Takamatsu | 398/162 |
| 5,926,303 A | 7/1999 | Giebel et al. | 359/163 |
| 5,943,152 A | 8/1999 | Mizrahi et al. | 398/196 |
| 5,953,690 A | 9/1999 | Lemon et al. | 702/191 |
| 5,956,168 A | 9/1999 | Levinson et al. | 398/41 |
| 6,010,538 A | 1/2000 | Sun et al. | 156/345.13 |
| 6,014,241 A | 1/2000 | Winter et al. | 359/124 |
| 6,020,593 A | 2/2000 | Chow et al. | 250/551 |
| 6,021,947 A | 2/2000 | Swartz | 235/472.01 |
| 6,023,147 A | 2/2000 | Cargin, Jr. et al. | 320/114 |
| 6,049,413 A | 4/2000 | Taylor et al. | 359/337 |
| 6,064,501 A | 5/2000 | Roberts et al. | 359/110 |
| 6,115,113 A | 9/2000 | Flockencier | 356/5.01 |
| H1881 H | 10/2000 | Davis et al. | 370/458 |
| 6,160,647 A | 12/2000 | Gilliland et al. | 398/23 |
| 6,175,434 B1 | 1/2001 | Feng | 359/152 |
| 6,423,963 B1 | 7/2002 | Wu | 250/227.14 |
| 6,473,224 B1 | 10/2002 | Dugan et al. | 359/341.44 |
| 6,512,617 B1 | 1/2003 | Tanji et al. | 398/137 |
| 2002/0027688 A1 | 3/2002 | Stephenson | 398/139 |
| 2002/0097468 A1 | 7/2002 | Mecherle et al. | 398/128 |
| 2002/0181894 A1 | 12/2002 | Gilliland et al. | 385/88 |
| 2003/0053170 A1 | 3/2003 | Levinson et al. | 398/139 |
| 2003/0113118 A1 | 6/2003 | Bartur | 398/139 |
| 2004/0120720 A1 | 6/2004 | Chang et al. | 398/139 |
| 2004/0240886 A1 | 12/2004 | Aronson et al. | 398/135 |

FOREIGN PATENT DOCUMENTS

| | | |
|---|---|---|
| JP | 6225975 A | 10/1987 |
| JP | 62281485 A | 12/1987 |
| JP | 402102589 A | 4/1990 |
| JP | 404023373 A | 1/1992 |
| WO | WO 93/21706 | 10/1993 |
| WO | PCT/US02/03226 | 5/2002 |
| WO | WO 02/063800 A1 | 8/2002 |
| WO | PCT/US04/11130 | 10/2004 |
| WO | WO 2004/098100 | 11/2004 |

INTEGRATED MEMORY MAPPED CONTROLLER CIRCUIT FOR FIBER OPTICS TRANSCEIVER

The present invention relates generally to the field of fiber optic transceivers and particularly to circuits used within the transceivers to accomplish control, setup, monitoring, and identification operations.

BACKGROUND OF INVENTION

The two most basic electronic circuits within a fiber optic transceiver are the laser driver circuit, which accepts high speed digital data and electrically drives an LED or laser diode to create equivalent optical pulses, and the receiver circuit which takes relatively small signals from an optical detector and amplifies and limits them to create a uniform amplitude digital electronic output. In addition to, and sometimes in conjunction with these basic functions, there are a number of other tasks that must be handled by the transceiver circuitry as well as a number of tasks that may optionally be handled by the transceiver circuit to improve its functionality. These tasks include, but are not necessarily limited to, the following:

Setup functions. These generally relate to the required adjustments made on a part-to-part basis in the factory to allow for variations in component characteristics such as laser diode threshold current.

Identification. This refers to general purpose memory, typically EEPROM (electrically erasable and programmable read only memory) or other nonvolatile memory. The memory is preferably accessible using a serial communication standard, that is used to store various information identifying the transceiver type, capability, serial number, and compatibility with various standards. While not standard, it would be desirable to further store in this memory additional information, such as sub-component revisions and factory test data.

Eye safety and general fault detection. These functions are used to identify abnormal and potentially unsafe operating parameters and to report these to the user and/or perform laser shutdown, as appropriate. In addition, it would be desirable in many transceivers for the control circuitry to perform some or all of the following additional functions:

Temperature compensation functions. For example, compensating for known temperature variations in key laser characteristics such as slope efficiency.

Monitoring functions. Monitoring various parameters related to the transceiver operating characteristics and environment. Examples of parameters that it would be desirable to monitor include laser bias current, laser output power, receiver power levels, supply voltage and temperature. Ideally, these parameters should be monitored and reported to, or made available to, a host device and thus to the user of the transceiver.

Power on time. It would be desirable for the transceiver's control circuitry to keep track of the total number of hours the transceiver has been in the power on state, and to report or make this time value available to a host device.

Margining. "Margining" is a mechanism that allows the end user to test the transceiver's performance at a known deviation from ideal operating conditions, generally by scaling the control signals used to drive the transceiver's active components.

Other digital signals. It would be desirable to enable a host device to be able to configure the transceiver so as to make it compatible with various requirements for the polarity and output types of digital inputs and outputs. For instance, digital inputs are used for transmitter disable and rate selection functions while outputs are used to indicate transmitter fault and loss of signal conditions. The configuration values would determine the polarity of one or more of the binary input and output signals. In some transceivers it would be desirable to use the configuration values to specify the scale of one or more of the digital input or output values, for instance by specifying a scaling factor to be used in conjunction with the digital input or output value.

Few if any of these additional functions are implemented in most transceivers, in part because of the cost of doing so. Some of these functions have been implemented using discrete circuitry, for example using a general purpose EEPROM for identification purposes, by inclusion of some functions within the laser driver or receiver circuitry (for example some degree of temperature compensation in a laser driver circuit) or with the use of a commercial microcontroller integrated circuit. However, to date there have not been any transceivers that provide a uniform device architecture that will support all of these functions, as well as additional functions not listed here, in a cost effective manner.

It is the purpose of the present invention to provide a general and flexible integrated circuit that accomplishes all (or any subset) of the above functionality using a straightforward memory mapped architecture and a simple serial communication mechanism.

FIG. 1 shows a schematic representation of the essential features of a typical prior-art fiber optic transceiver. The main circuit 1 contains at a minimum transmit and receiver circuit paths and power 19 and ground connections 18. The receiver circuit typically consists of a Receiver Optical Subassembly (ROSA) 2 which contains a mechanical fiber receptacle as well as a photodiode and pre-amplifier (preamp) circuit. The ROSA is in turn connected to a post-amplifier (postamp) integrated circuit 4, the function of which is to generate a fixed output swing digital signal which is connected to outside circuitry via the RX+ and RX− pins 17. The postamp circuit also often provides a digital output signal known as Signal Detect or Loss of Signal indicating the presence or absence of suitably strong optical input. The Signal Detect output is provided as an output on pin 18. The transmit circuit will typically consist of a Transmitter Optical Subassembly (TOSA), 3 and a laser driver integrated circuit 5. The TOSA contains a mechanical fiber receptacle as well as a laser diode or LED. The laser driver circuit will typically provide AC drive and DC bias current to the laser. The signal inputs for the AC driver are obtained from the TX+ and TX− pins 12. Typically, the laser driver circuitry will require individual factory setup of certain parameters such as the bias current (or output power) level and AC modulation drive to the laser. Typically this is accomplished by adjusting variable resistors or placing factory selected resistors 7, 9 (i.e., having factory selected resistance values). Additionally, temperature compensation of the bias current and modulation is often required. This function can be integrated in the laser driver integrated circuit or accomplished through the use of external temperature sensitive elements such as thermistors 6, 8.

In addition to the most basic functions described above, some transceiver platform standards involve additional functionality. Examples of this are the TX disable 13 and TX fault 14 pins described in the GBIC standard. In the GBIC standard, the TX disable pin allows the transmitter to be shut off by the host device, while the TX fault pin is an indicator to the host device of some fault condition existing in the laser or associated laser driver circuit. In addition to this basic description, the GBIC standard includes a series of timing diagrams describing how these controls function and interact with each other to implement reset operations and other actions. Most of this functionality is aimed at preventing non-eyesafe emission levels when a fault conditions exists in the laser circuit. These functions may be integrated into the laser driver circuit itself or in an optional additional integrated circuit 11. Finally, the GBIC standard also requires the EEPROM 10 to store standardized serial ID information that can be read out via a serial interface (defined as using the serial interface of the ATMEL AT24C01A family of EEPROM products) consisting of a clock 15 and data 16 line.

As an alternative to mechanical fiber receptacles, some prior art transceivers use fiber optic pigtails which are standard, male fiber optic connectors.

Similar principles clearly apply to fiber optic transmitters or receivers that only implement half of the full transceiver functions.

SUMMARY OF THE INVENTION

The present invention is preferably implemented as a single-chip integrated circuit, sometimes called a controller, for controlling a transceiver having a laser transmitter and a photodiode receiver. The controller includes memory for storing information related to the transceiver, and analog to digital conversion circuitry for receiving a plurality of analog signals from the laser transmitter and photodiode receiver, converting the received analog signals into digital values, and storing the digital values in predefined locations within the memory. Comparison logic compares one or more of these digital values with limit values, generates flag values based on the comparisons, and stores the flag values in predefined locations within the memory. Control circuitry in the controller controls the operation of the laser transmitter in accordance with one or more values stored in the memory. A serial interface is provided to enable a host device to read from and write to locations within the memory. A plurality of the control functions and a plurality of the monitoring functions of the controller are exercised by a host computer by accessing corresponding memory mapped locations within the controller.

In some embodiments the controller further includes a cumulative clock for generating a time value corresponding to cumulative operation time of the transceiver, wherein the generated time value is readable via the serial interface.

In some embodiments the controller further includes a power supply voltage sensor that generates a power level signal corresponding to a power supply voltage level of the transceiver. In these embodiments the analog to digital conversion circuitry is configured to convert the power level signal into a digital power level value and to store the digital power level value in a predefined power level location within the memory. Further, the comparison logic of the controller may optionally include logic for comparing the digital power level value with a power (i.e., voltage) level limit value, generating a flag value based on the comparison of the digital power level signal with the power level limit value, and storing a power level flag value in a predefined power level flag location within the memory. It is noted that the power supply voltage sensor measures the transceiver voltage supply level, which is distinct from the power level of the received optical signal.

In some embodiments the controller further includes a temperature sensor that generates a temperature signal corresponding to a temperature of the transceiver. In these embodiments the analog to digital conversion circuitry is configured to convert the temperature signal into a digital temperature value and to store the digital temperature value in a predefined temperature location within the memory. Further, the comparison logic of the controller may optionally include logic for comparing the digital temperature value with a temperature limit value, generating a flag value based on the comparison of the digital temperature signal with the temperature limit value, and storing a temperature flag value in a predefined temperature flag location within the memory.

In some embodiments the controller further includes "margining" circuitry for adjusting one or more control signals generated by the control circuitry in accordance with an adjustment value stored in the memory.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF PREFERRED EMBODIMENTS

Figure 1:
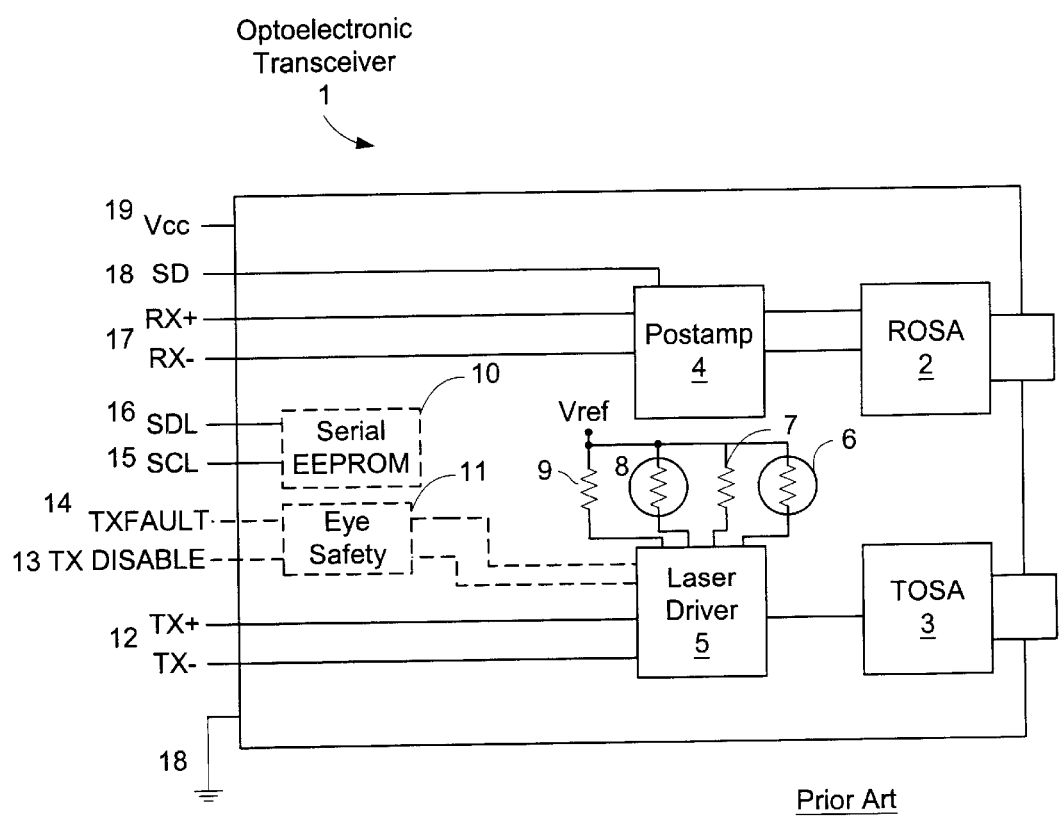
FIG. 1 is a block diagram of a prior art optoelectronic transceiver.
Figure 2:
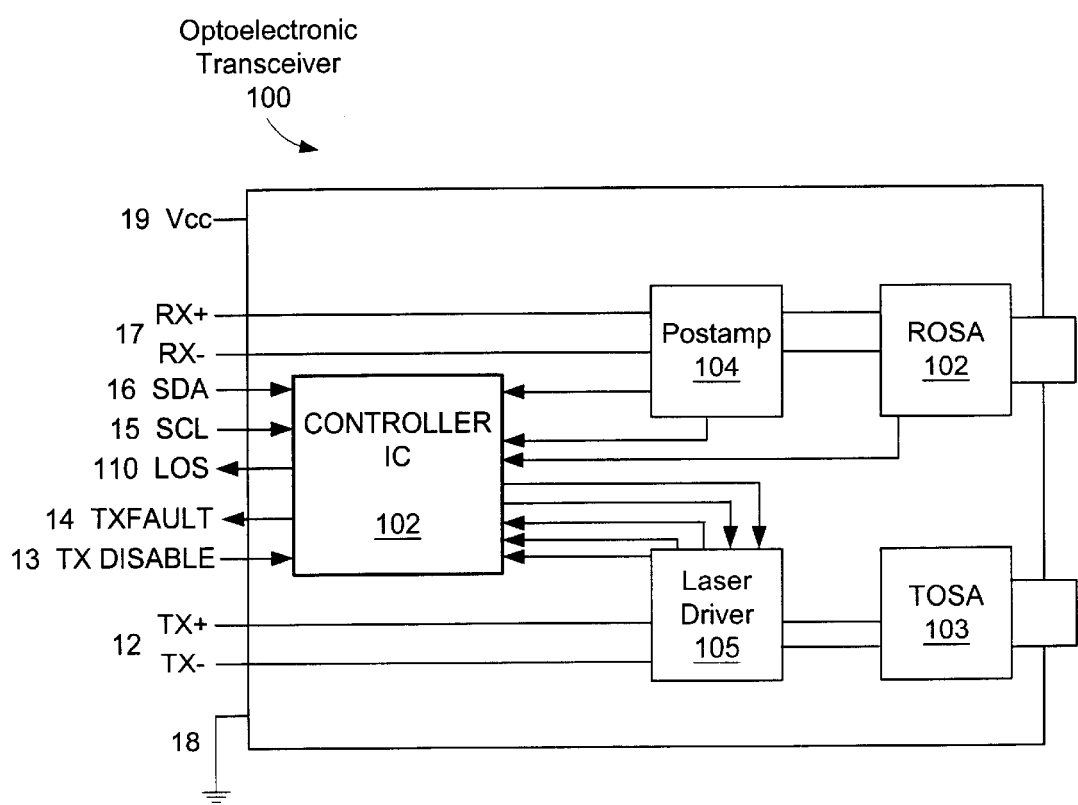
FIG. 2 is a block diagram of an optoelectronic transceiver in accordance with the present invention.
Figure 3:
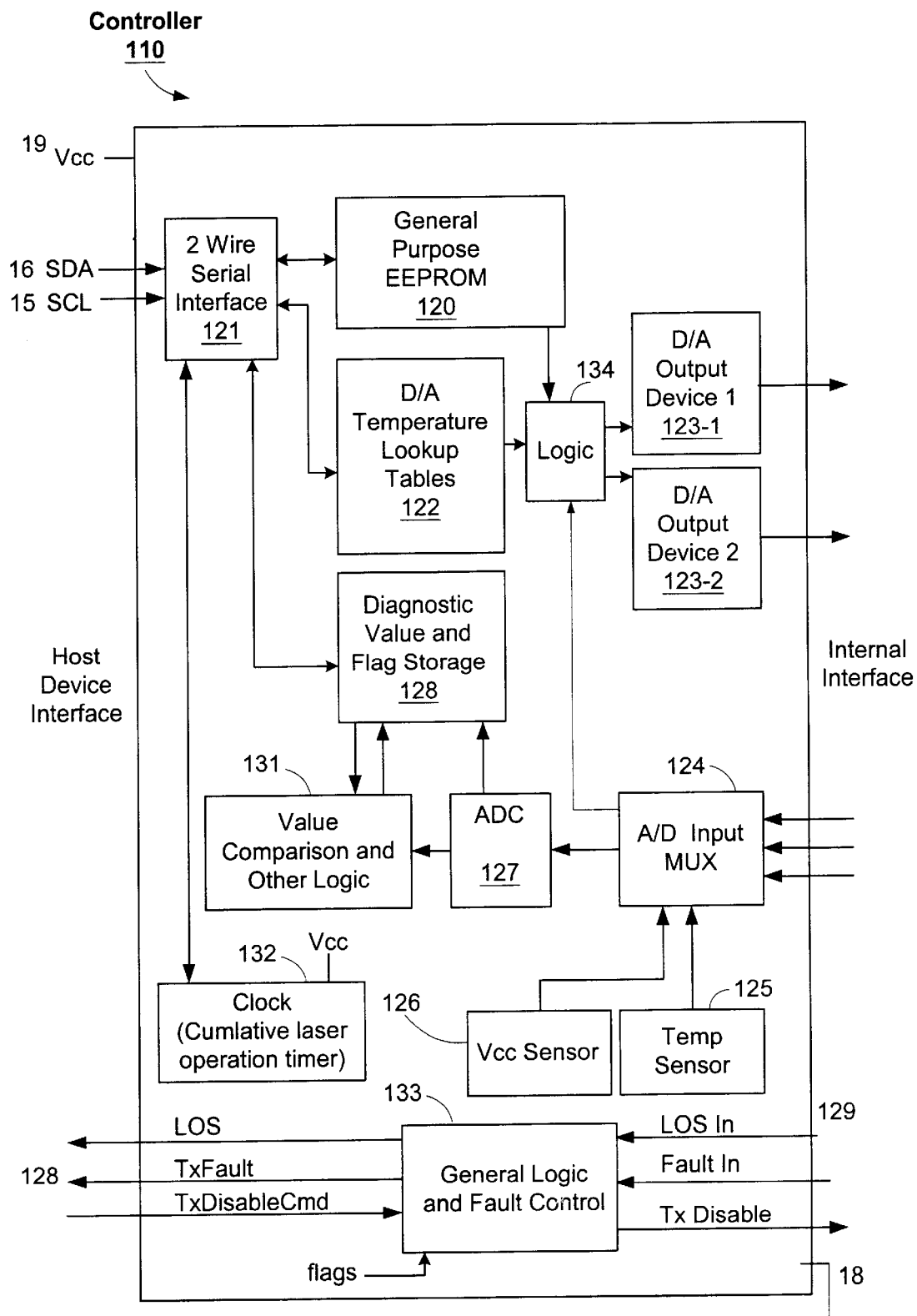
FIG. 3 is a block diagram of modules within the controller of the optoelectronic transceiver of FIG. 2.

A transceiver 100 based on the present invention is shown in FIGS. 2 and 3. The transceiver 100 contains a Receiver Optical Subassembly (ROSA) 102 and Transmitter Optical Subassembly (TOSA) 103 along with associated post-amplifier 104 and laser driver 105 integrated circuits that communicate the high speed electrical signals to the outside world. In this case, however, all other control and setup functions are implemented with a third single-chip integrated circuit 110 called the controller IC.

The controller IC 110 handles all low speed communications with the end user. These include the standardized pin functions such as Loss of Signal (LOS) 111, Transmitter Fault Indication (TX FAULT) 14, and the Transmitter Disable Input (TXDIS) 13. The controller IC 110 has a two wire serial interface 121, also called the memory interface, for accessing memory mapped locations in the controller. Memory Map Tables 1, 2, 3 and 4, below, are an exemplary memory map for one embodiment of a transceiver controller, as implemented in one embodiment of the present invention. It is noted that Memory Map Tables 1, 2, 3 and 4, in addition to showing a memory map of values and control features described in this document, also show a number of parameters and control mechanisms that are outside the scope of this document and thus are not part of the present invention.

The interface 121 is coupled to host device interface input/output lines, typically clock (SCL) and data (SDA) lines, 15 and 16. In the preferred embodiment, the serial interface 121 operates in accordance with the two wire serial interface standard that is also used in the GBIC and SFP standards, however other serial interfaces could equally well be used in alternate embodiments. The two wire serial interface 121 is used for all setup and querying of the controller IC 110, and enables access to the optoelectronic transceiver's control circuitry as a memory mapped device. That is, tables and parameters are set up by writing values to predefined memory locations of one or more nonvolatile memory devices 120, 122, 128 (e.g., EEPROM devices) in the controller, whereas diagnostic and other output and status values are output by reading predetermined memory locations of the same nonvolatile memory devices 120, 121, 122. This technique is consistent with currently defined serial ID functionality of many transceivers where a two wire serial interface is used to read out identification and capability data stored in EEPROM.

It is noted here that some of the memory locations in the memory devices 120, 122, 128 are dual ported, or even triple ported in some instances. That is, while these memory mapped locations can be read and in some cases written via the serial interface 121, they are also directly accessed by other circuitry in the controller 110. For instance, certain "margining" values stored in memory 120 are read and used directly by logic 134 to adjust (i.e., scale upwards or downwards) drive level signals being sent to the D/A output devices 123. Similarly, there are flags stored memory 128 that are (A) written by logic circuit 131, and (B) read directly by logic circuit 133. An example of a memory mapped location not in memory devices but that is effectively dual ported is the output or result register of clock 132. In this case the accumulated time value in the register is readable via the serial interface 121, but is written by circuitry in the clock circuit 132.

In addition to the result register of the clock 132, other memory mapped locations in the controller may be implemented as registers at the input or output of respective sub-circuits of the controller. For instance, the margining values used to control the operation of logic 134 may be stored in registers in or near logic 134 instead of being stored within memory device 128. In another example, measurement values generated by the ADC 127 may be stored in registers. The memory interface 121 is configured to enable the memory interface to access each of these registers whenever the memory interface receives a command to access the data stored at the corresponding predefined memory mapped location. In such embodiments, "locations within the memory" include memory mapped registers throughout the controller.

In an alternate embodiment, the time value in the result register of the clock 132, or a value corresponding to that time value, is periodically stored in a memory location with the memory 128 (e.g., this may be done once per minute, or one per hour of device operation). In this alternate embodiment, the time value read by the host device via interface 121 is the last time value stored into the memory 128, as opposed to the current time value in the result register of the clock 132.

As shown in FIGS. 2 and 3, the controller IC 110 has connections to the laser driver 105 and receiver components. These connections serve multiple functions. The controller IC has a multiplicity of D/A converters 123. In the preferred embodiment the D/A converters are implemented as current sources, but in other embodiments the D/A converters may be implemented using voltage sources, and in yet other embodiments the D/A converters may be implemented using digital potentiometers. In the preferred embodiment, the output signals of the D/A converters are used to control key parameters of the laser driver circuit 105. In one embodiment, outputs of the D/A converters 123 are use to directly control the laser bias current as well as control of the level AC modulation to the laser (constant bias operation). In another embodiment, the outputs of the D/A converters 123 of the controller 110 control the level of average output power of the laser driver 105 in addition to the AC modulation level (constant power operation).

In a preferred embodiment, the controller 110 includes mechanisms to compensate for temperature dependent characteristics of the laser. This is implemented in the controller 110 through the use of temperature lookup tables 122 that are used to assign values to the control outputs as a function of the temperature measured by a temperature sensor 125 within the controller IC 110. In alternate embodiments, the controller 110 may use D/A converters with voltage source outputs or may even replace one or more of the D/A converters 123 with digital potentiometers to control the characteristics of the laser driver 105. It should also be noted that while FIG. 2 refers to a system where the laser driver 105 is specifically designed to accept inputs from the controller 110, it is possible to use the controller IC 110 with many other laser driver ICs to control their output characteristics.

In addition to temperature dependent analog output controls, the controller IC may be equipped with a multiplicity of temperature independent (one memory set value) analog outputs. These temperature independent outputs serve numerous functions, but one particularly interesting application is as a fine adjustment to other settings of the laser driver 105 or postamp 104 in order to compensate for process induced variations in the characteristics of those devices. One example of this might be the output swing of the receiver postamp 104. Normally such a parameter would be fixed at design time to a desired value through the use of a set resistor. It often turns out, however, that normal process variations associated with the fabrication of the postamp integrated circuit 104 induce undesirable variations in the resulting output swing with a fixed set resistor. Using the present invention, an analog output of the controller IC 110, produced by an additional D/A converter 123, is used to adjust or compensate the output swing setting at manufacturing setup time on a part-by-part basis.

In addition to the connection from the controller to the laser driver 105, FIG. 2 shows a number of connections from the laser driver 105 to the controller IC 110, as well as similar connections from the ROSA 106 and Postamp 104 to the controller IC 110. These are analog monitoring connections that the controller IC 110 uses to provide diagnostic feedback to the host device via memory mapped locations in the controller IC. The controller IC 110 in the preferred embodiment has a multiplicity of analog inputs. The analog input signals indicate operating conditions of the transceiver and/or receiver circuitry. These analog signals are scanned by a multiplexer 124 and converted using an analog to digital converter (ADC) 127. The ADC 127 has 12 bit resolution in the preferred embodiment, although ADC's with other resolution levels may be used in other embodiments. The converted values are stored in predefined memory locations, for instance in the diagnostic value and flag storage device 128 shown in FIG. 3, and are accessible to the host device via memory reads. These values are calibrated to standard units (such as millivolts or microwatts) as part of a factory calibration procedure.

The digitized quantities stored in memory mapped locations within the controller IC include, but are not limited to, the laser bias current, transmitted laser power, and received power (as measured by the photodiode detector in the ROSA 102). In the memory map tables (e.g., Table 1), the measured laser bias current is denoted as parameter $B_{in}$, the measured transmitted laser power is denoted as $P_{in}$, and the measured received power is denoted as $R_{in}$. The memory map tables indicate the memory locations where, in an exemplary implementation, these measured values are stored, and also show where the corresponding limit values, flag values, and configuration values (e.g., for indicating the polarity of the flags) are stored.

As shown in FIG. 3, the controller 110 includes a voltage supply sensor 126. An analog voltage level signal generated by this sensor is converted to a digital voltage level signal by the ADC 127, and the digital voltage level signal is stored in memory 128. In a preferred embodiment, the A/D input mux 124 and ADC 127 are controlled by a clock signal so as to automatically, periodically convert the monitored signals into digital signals, and to store those digital values in memory 128.

Furthermore, as the digital values are generated, the value comparison logic 131 of the controller compares these values to predefined limit values. The limit values are preferably stored in memory 128 at the factory, but the host device may overwrite the originally programmed limit values with new limit values. Each monitored signal is automatically compared with both a lower limit and upper limit value, resulting in the generation of two limit flag values that are then stored in the diagnostic value and flag storage device 128. For any monitored signals where there is no meaningful upper or lower limit, the corresponding limit value can be set to a value that will never cause the corresponding flag to be set.

The limit flags are also sometimes call alarm and warning flags. The host device (or end user) can monitor these flags to determine whether conditions exist that are likely to have caused a transceiver link to fail (alarm flags) or whether conditions exist which predict that a failure is likely to occur soon. Examples of such conditions might be a laser bias current which has fallen to zero, which is indicative of an immediate failure of the transmitter output, or a laser bias current in a constant power mode which exceeds its nominal value by more than 50%, which is an indication of a laser end-of-life condition. Thus, the automatically generated limit flags are useful because they provide a simple pass-fail decision on the transceiver functionality based on internally stored limit values.

In a preferred embodiment, fault control and logic circuit 133 logically OR's the alarm and warning flags, along with the internal LOS (loss of signal) input and Fault Input signals, to produce a binary Transceiver fault (TxFault) signal that is coupled to the host interface, and thus made available to the host device. The host device can be programmed to monitor the TxFault signal, and to respond to an assertion of the TxFault signal by automatically reading all the alarm and warning flags in the transceiver, as well as the corresponding monitored signals, so as to determine the cause of the alarm or warning.

The fault control and logic circuit 133 furthermore conveys a loss of signal (LOS) signal received from the receiver circuit (ROSA, FIG. 2) to the host interface.

Another function of the fault control and logic circuit 133 is to disable the operation of the transmitter (TOSA, FIG. 2) when needed to ensure eye safety. There is a standards defined interaction between the state of the laser driver and the Tx Disable output, which is implemented by the fault control and logic circuit 133. When the logic circuit 133 detects a problem that might result in an eye safety hazard, the laser driver is disabled by activating the Tx Disable signal of the controller. The host device can reset this condition by sending a command signal on the TxDisableCmd line of the host interface.

Yet another function of the fault control and logic circuit 133 is to determine the polarity of its input and output signals in accordance with a set of configuration flags stored in memory 128. For instance, the Loss of Signal (LOS) output of circuit 133 may be either a logic low or logic high signal, as determined by a corresponding configuration flag stored in memory 128.

Other configuration flags (see Table 4) stored in memory 128 are used to determine the polarity of each of the warning and alarm flags. Yet other configuration values stored in memory 128 are used to determine the scaling applied by the ADC 127 when converting each of the monitored analog signals into digital values.

In an alternate embodiment, another input to the controller 102, at the host interface, is a rate selection signal. In FIG. 3 the rate selection signal is input to logic 133. This host generated signal would typically be a digital signal that specifies the expected data rate of data to be received by the receiver (ROSA 102). For instance, the rate selection signal might have two values, representing high and low data rates (e.g., 2.5 Gb/s and 1.25 Gb/s). The controller responds to the rate selection signal by generating control signals to set the analog receiver circuitry to a bandwidth corresponding to the value specified by the rate selection signal.

While the combination of all of the above functions is desired in the preferred embodiment of this transceiver controller, it should be obvious to one skilled in the art that a device which only implements a subset of these functions would also be of great use. Similarly, the present invention is also applicable to transmitters and receivers, and thus is not solely applicable to transceivers. Finally, it should be pointed out that the controller of the present invention is suitable for application of multichannel optical links.

TABLE 1

MEMORY MAP FOR TRANSCEIVER CONTROLLER

| Memory Location (Array 0) | Name of Location | Function |
| --- | --- | --- |
| 00h–5Fh | IEEE Data | This memory block is used to store required GBIC data |
| 60h | Temperature MSB | This byte contains the MSB of the 15-bit 2's complement temperature output from the temperature sensor. |

TABLE 1-continued

MEMORY MAP FOR TRANSCEIVER CONTROLLER

| | Name of Location | Function |
|---|---|---|
| 61h | Temperature LSB | This byte contains the LSB of the 15-bit 2's complement temperature output from the temperature sensor. (LSB is 0b). |
| 62h–63h | $V_{cc}$ Value | These bytes contain the MSB (62h) and the LSB (63h) of the measured $V_{cc}$ (15-bit number, with a 0b LSbit) |
| 64h–65h | $B_{in}$ Value | These bytes contain the MSB (64h) and the LSB (65h) of the measured $B_{in}$ (laser bias current) (15-bit number, with a 0b LSbit) |
| 66h–67h | $P_{in}$ Value | These bytes contain the MSB (66h) and the LSB (67h) of the measured $P_{in}$ (transmitted laser power) (15-bit number, with a 0b LSbit) |
| 68h–69h | $R_{in}$ Value | These bytes contain the MSB (68h) and the LSB (69h) of the measured $R_{in}$ (received power) (15-bit number, with a 0b LSbit) |
| 6Ah–6Dh | Reserved | Reserved |
| 6Eh | IO States | This byte shows the logical value of the I/O pins. |
| 6Fh | A/D Updated | Allows the user to verify if an update from the A/D has occurred to the 5 values: temperature, Vcc, $B_{in}$, $P_{in}$ and $R_{in}$. The user writes the byte to 00h. Once a conversion is complete for a give value, its bit will change to '1'. |
| 70h–73h | Alarm Flags | These bits reflect the state of the alarms as a conversion updates. High alarm bits are '1' if converted value is greater than corresponding high limit. Low alarm bits are '1' if converted value is less than corresponding low limit. Otherwise, bits are 0b. |
| 74h–77h | Warning Flags | These bits reflect the state of the warnings as a conversion updates. High warning bits are '1' if converted value is greater than corresponding high limit. Low warning bits are '1' if converted value is less than corresponding low limit. Otherwise, bits are 0b. |
| 78h–7Ah | Reserved | Reserved |
| 7Bh–7Eh | Password Entry Bytes PWE Byte 3 (7Bh) MSByte PWE Byte 2 (7Ch) PWE Byte 1 (7Dh) PWE Byte 0 (7Eh) LSByte | The four bytes are used for password entry. The entered password will determine the user's read/write privileges. |
| 7Fh | Array Select | Writing to this byte determines which of the upper pages of memory is selected for reading and writing. 0xh (Array x Selected) Where x = 1, 2, 3, 4, or 5 |
| 80h–FFh Memory Location (Array 1) | | Reserved/not currently implemented |
| 80h–FFh Memory Location (Array 2) | | Data EEPROM |
| 80h–FFh Memory Location (Array 3) | | Data EEPROM |
| 80h–81h 88h–89h 90h–91h 98h–99h A0h–A1h | Temperature High Alarm Vcc High Alarm $B_{in}$ High Alarm $P_{in}$ High Alarm $R_{in}$ High Alarm | The value written to this location serves as the high alarm limit. Data format is the same as the corresponding value (temperature, Vcc, $B_{in}$, $P_{in}$ $R_{in}$). |
| 82h–83h 8Ah–8Bh 92h–93h 9Ah–9Bh | Temperature Low Alarm Vcc Low Alarm $B_{in}$ Low Alarm | The value written to this location serves as the low alarm limit. Data format is the same as the corresponding value (temperature, Vcc, $B_{in}$, $P_{in}$ $R_{in}$). |

TABLE 1-continued

MEMORY MAP FOR TRANSCEIVER CONTROLLER

| | Name of Location | Function |
|---|---|---|
| A2h–A3h | $P_{in}$ Low Alarm | |
| | $R_{in}$ Low Alarm | |
| 84h–85h | Temp High Warning | The value written to this location serves as the |
| 8Ch–8Dh | Vcc High Warning | high warning limit. Data format is the same as |
| 94h–95h | $B_{in}$ High Warning | the corresponding value (temperature, Vcc, $B_{in}$, |
| 9Ch–9Dh | $P_{in}$ High Warning | $P_{in}$ $R_{in}$). |
| A4h–A5h | $R_{in}$ High Warning | |
| 86h–87h | Temperature Low | The value written to this location serves as the |
| 8Eh–8Fh | Warning | low warning limit. Data format is the same as |
| 96h–97h | Vcc Low Warning | the corresponding value (temperature, Vcc, $B_{in}$, |
| 9Eh–9Fh | $B_{in}$ Low Warning | $P_{in}$ $R_{in}$). |
| A6h–A7h | $P_{in}$ Low Warning | |
| | $R_{in}$ Low Warning | |
| A8h–AFh, | $D_{out}$ control 0–8 | Individual bit locations are defined in Table 4. |
| C5h | $F_{out}$ control 0–8 | |
| B0h–B7h, | $L_{out}$ control 0–8 | |
| C6h | | |
| B8h–BFh, | | |
| C7h | | |
| C0h | Reserved | Reserved |
| C1h | Prescale | Selects MCLK divisor for X-delay CLKS. |
| C2h | $D_{out}$ Delay | Selects number of prescale clocks |
| C3h | $F_{out}$ Delay | |
| C4h | $L_{out}$ Delay | |
| C8h–C9h | Vcc-A/D Scale | 16 bits of gain adjustment for corresponding |
| CAh–CBh | $B_{in}$-A/D Scale | A/D conversion values. |
| CCh–CDh | $P_{in}$-A/D Scale | |
| CEh–CFh | $R_{in}$-A/D Scale | |
| D0h | Chip Address | Selects chip address when external pin ASEL is low. |
| D1h | Margin #2 | Finisar Selective Percentage (FSP) for D/A #2 |
| D2h | Margin #1 | Finisar Selective Percentage (FSP) for D/A #1 |
| D3h–D6h | PW1 Byte 3 (D3h) MSB | The four bytes are used for password 1 entry. |
| | PW1 Byte 2 (D4h) | The entered password will determine the |
| | PW1 Byte 1 (D5h) | Finisar customer's read/write privileges. |
| | PW1 Byte 0 (D6h) LSB | |
| D7h | D/A Control | This byte determines if the D/A outputs source or sink current, and it allows for the outputs to be scaled. |
| D8h–DFh | $B_{in}$ Fast Trip | These bytes define the fast trip comparison over temperature. |
| E0h–E3h | $P_{in}$ Fast Trip | These bytes define the fast trip comparison over temperature. |
| E4h–E7h | $R_{in}$ Fast Trip | These bytes define the fast trip comparison over temperature. |
| E8h | Configuration Override Byte | Location of the bits is defined in Table 4 |
| E9h | Reserved | Reserved |
| EAh–EBh | Internal State Bytes | Location of the bits is defined in Table 4 |
| ECh | I/O States 1 | Location of the bits is defined in Table 4 |
| EDh–EEh | D/A Out | Magnitude of the temperature compensated D/A outputs |
| EFh | Temperature Index | Address pointer to the look-up Arrays |
| F0h–FFh | Reserved | Reserved |
| Memory Location (Array 4) | | |
| 00h–FFh | | D/A Current vs. Temp #1 (User-Defined Look-up Array #1) |
| Memory Location (Array 5) | | |
| 00h–FFh | | D/A Current vs. Temp #2 (User-Defined Look-up Array #2) |

TABLE 2

DETAIL MEMORY DESCRIPTIONS-A/D VALUES AND STATUS BITS

| Byte | Bit | Name | Description |
|---|---|---|---|
| Converted analog values. Calibrated 16 bit data. (See Notes 1–2) | | | |
| 96 (60h) | All | Temperature MSB | Signed 2's complement integer temperature (−40 to +125 C.) Based on internal temperature measurement |
| 97 | All | Temperature LSB | Fractional part of temperature (count/256) |
| 98 | All | Vcc MSB | Internally measured supply voltage in transceiver. Actual voltage is full 16 bit value* 100 uVolt. |
| 99 | All | Vcc LSB | (Yields range of 0–6.55 V) |
| 100 | All | TX Bias MSB | Measured TX Bias Current in mA Bias current is full 16 bit value *(1/256) mA. |
| 101 | All | TX Bias LSB | (Full range of 0–256 mA possible with 4 uA resolution) |
| 102 | All | TX Power MSB | Measured TX output power in mW. Output is full 16 bit value *(1/2048) mW. (see note 5) |
| 103 | All | TX Power LSB | (Full range of 0–32 mW possible with 0.5 μW resolution, or −33 to +15 dBm) |
| 104 | All | RX Power MSB | Measured RX input power in mW RX power is full 16 bit value *(1/16384) mW. (see note 6) |
| 105 | All | RX Power LSB | (Full range of 0–4 mW possible with 0.06 μW resolution, or −42 to +6 dBm) |
| 106 | All | Reserved MSB | Reserved for 1st future definition of digitized analog input |
| 107 | All | Reserved LSB | Reserved for 1st future definition of digitized analog input |
| 108 | All | Reserved MSB | Reserved for 2nd future definition of digitized analog input |
| 109 | All | Reserved LSB | Reserved for 2nd future definition of digitized analog input |
| General Status Bits | | | |
| 110 | 7 | TX Disable | Digital state of the TX Disable Input Pin |
| 110 | 6 | Reserved | |
| 110 | 5 | Reserved | |
| 110 | 4 | Rate Select | Digital state of the SFP Rate Select Input Pin |
| 110 | 3 | Reserved | |
| 110 | 2 | TX Fault | Digital state of the TX Fault Output Pin |
| 110 | 1 | LOS | Digital state of the LOS Output Pin |
| 110 | 0 | Power-On-Logic | Indicates transceiver has achieved power up and data valid |
| 111 | 7 | Temp A/D Valid | Indicates A/D value in Bytes 96/97 is valid |
| 111 | 6 | Vcc A/D Valid | Indicates A/D value in Bytes 98/99 is valid |
| 111 | 5 | TX Bias A/D Valid | Indicates A/D value in Bytes 100/101 is valid |
| 111 | 4 | TX Power A/D Valid | Indicates A/D value in Bytes 102/103 is valid |
| 111 | 3 | RX Power A/D Valid | Indicates A/D value in Bytes 104/105 is valid |
| 111 | 2 | Reserved | Indicates A/D value in Bytes 106/107 is valid |
| 111 | 1 | Reserved | Indicates A/D value in Bytes 108/109 is valid |
| 111 | 0 | Reserved | Reserved |

TABLE 3

DETAIL MEMORY DESCRIPTIONS-ALARM AND WARNING FLAG BITS

Alarm and Warning Flag Bits

| Byte | Bit | Name | Description |
|---|---|---|---|
| 112 | 7 | Temp High Alarm | Set when internal temperature exceeds high alarm level. |
| 112 | 6 | Temp Low Alarm | Set when internal temperature is below low alarm level. |
| 112 | 5 | Vcc High Alarm | Set when internal supply voltage exceeds high alarm level. |
| 112 | 4 | Vcc Low Alarm | Set when internal supply voltage is below low alarm level. |
| 112 | 3 | TX Bias High Alarm | Set when TX Bias current exceeds high alarm level. |
| 112 | 2 | TX Bias Low Alarm | Set when TX Bias current is below low alarm level. |
| 112 | 1 | TX Power High Alarm | Set when TX output power exceeds high alarm level. |
| 112 | 0 | TX Power Low Alarm | Set when TX output power is below low alarm level. |
| 113 | 7 | RX Power High Alarm | Set when Received Power exceeds high alarm level. |
| 113 | 6 | RX Power Low Alarm | Set when Received Power is below low alarm level. |
| 113 | 5-0 | Reserved Alarm | |
| 114 | All | Reserved | |
| 115 | All | Reserved | |
| 116 | 7 | Temp High Warning | Set when internal temperature exceeds high warning level. |
| 116 | 6 | Temp Low Warning | Set when internal temperature is below low warning level. |
| 116 | 5 | Vcc High Warning | Set when internal supply voltage exceeds high warning level. |
| 116 | 4 | Vcc Low Warning | Set when internal supply voltage is below low warning level. |
| 116 | 3 | TX Bias High Warning | Set when TX Bias current exceeds high warning level. |
| 116 | 2 | TX Bias Low Warning | Set when TX Bias current is below low warning level. |
| 116 | 1 | TX Power High Warning | Set when TX output power exceeds high warning level. |
| 116 | 0 | TX Power Low Warning | Set when TX output power is below low warning level. |
| 117 | 7 | RX Power High Warning | Set when Received Power exceeds high warning level. |
| 117 | 6 | RX Power Low Warning | Set when Received Power is below low warning level. |
| 117 | 5 | Reserved Warning | |
| 117 | 4 | Reserved Warning | |
| 117 | 3 | Reserved Warning | |
| 117 | 2 | Reserved Warning | |
| 117 | 1 | Reserved Warning | |
| 117 | 0 | Reserved Warning | |
| 118 | All | Reserved | |
| 119 | All | Reserved | |

TABLE 4

| Byte Name | Bit 7 | Bit 6 | Bit 5 | Bit 4 | Bit 3 | Bit 2 | Bit 1 | Bit 0 |
|---|---|---|---|---|---|---|---|---|
| X-out cntl0 | T alrm hi set | T alrm lo set | V alrm hi set | V alrm lo set | B alrm hi set | B alrm lo set | P alrm hi set | P alrm lo set |
| X-out cntl1 | R alrm hi set | R alrm lo set | B ft hi set | P ft hi set | R ft hi set | D-in inv set | D-in set | F-in inv set |
| X-out cntl2 | F-in set | L-in inv set | L-in set | Aux inv set | Aux set | T alrm hi hib | T alrm lo hib | V alrm hi hib |
| X-out cntl3 | V alrm lo hib | B alrm hi hib | B alrm lo hib | P alrm hi hib | P alrm lo hib | R alrm hi hib | R alrm lo hib | B ft hi hib |
| X-out cntl4 | P ft hi hib | R ft hi hib | D-in inv hib | D-in hib | F-in inv hib | F-in hib | L-in inv hib | L-in hib |
| X-out cntl5 | Aux inv hib | Aux hib | T alrm hi clr | T alrm lo clr | V alrm hi clr | V alrm lo clr | B alrm hi clr | B alrm lo clr |
| X-out cntl6 | P alrm hi clr | P alrm lo clr | R alrm hi clr | R alrm lo clr | B ft hi clr | P ft hi clr | R ft hi clr | D-in inv clr |
| X-out cntl7 | D-in clr | F-in inv clr | F-in clr | L-in inv clr | L-in clr | Aux inv clr | Aux clr | EE |
| X-out cntl8 | latch select | invert | o-ride data | o-ride select | S reset data | HI enable | LO enable | Pullup enable |
| Prescale | reserved | reserved | Reserved | reserved | $B^3$ | $B^2$ | $B^1$ | $B^0$ |
| X-out delay | $B^7$ | $B^6$ | $B^5$ | $B^4$ | $B^3$ | $B^2$ | $B^1$ | $B^0$ |
| chip address | $b^7$ | $b^6$ | $b^5$ | $b^4$ | $b^3$ | $b^2$ | $b^1$ | X |
| X-ad scale MSB | $2^{15}$ | $2^{14}$ | $2^{13}$ | $2^{12}$ | $2^{11}$ | $2^{10}$ | $2^9$ | $2^8$ |
| X-ad scale LSB | $2^7$ | $2^6$ | $2^5$ | $2^4$ | $2^3$ | $2^2$ | $2^1$ | $2^0$ |
| D/A cntl | source/ sink 1/0 | $2^2$ | D/A #2 range $2^1$ | $2^0$ | source/ sink 1/0 | $2^2$ | D/A #1 range $2^1$ | $2^0$ |
| config/O-ride | manual D/A | manual index | manual AD alarm | EE Bar | SW-POR | A/D Enable | Manual fast alarm | reserved |
| Internal State 1 | D-set | D-inhibit | D-delay | D-clear | F-set | F-inhibit | F-delay | F-clear |
| Internal State 0 | L-set | L-inhibit | L-delay | L-clear | reserved | reserved | reserved | reserved |
| I/O States 1 | reserved | F-in | L-in | reserved | D-out | reserved | reserved | reserved |
| Margin #1 | Reserved | Neg_Scale2 | Neg_Scale1 | Neg_Scale0 | Reserved | Pos_Scale2 | Pos_Scale1 | Pos_Scale0 |
| Margin #2 | Reserved | Neg_Scale2 | Neg_Scale1 | Neg_Scale0 | Reserved | Pos_Scale2 | Pos_Scale1 | Pos_Scale0 |

What is claimed is:

1. A single-chip integrated circuit for controlling an optoelectronic transceiver having a laser transmitter and a photodiode receiver, comprising:

memory, including one or more memory arrays for storing information related to the transceiver;

analog to digital conversion circuitry for receiving a plurality of analog signals from the laser transmitter and photodiode receiver, converting the received analog signals into digital values, and storing the digital values in predefined locations within the memory;

control circuitry configured to generate control signals to control operation of the laser transmitter in accordance with one or more values stored in the memory;

an interface for allowing a host to read directly from and write directly to locations within the memory; and comparison logic for comparing the digital values with limit values to generate flag values, wherein the flag values are stored in predefined locations within the memory during operation of the optoelectronic transceiver.

2. The single-chip integrated circuit of claim 1, further including:

a cumulative clock for generating a time value corresponding to cumulative operation time of the transceiver, wherein the generated time value is readable via the interface.

3. The single-chip integrated circuit of claim 1, further including:

a cumulative clock for generating and storing in a register a time value corresponding to cumulative operation time of the transceiver, wherein the register in which the time value is stored comprises one of the memory arrays of the memory.

4. The single-chip integrated circuit of claim 1, further including:

a power supply voltage sensor coupled to the analog to digital conversion circuitry, the power supply voltage sensor generating a power level signal corresponding to a power supply voltage level of the transceiver, wherein the analog to digital conversion circuitry is configured to convert the power level signal into a digital power level value and to store the digital power level value in a predefined power level location within the memory.

5. The single-chip integrated circuit of claim 4, further including:

a temperature sensor coupled to the analog to digital conversion circuitry, the temperature sensor generating a temperature signal corresponding to a temperature of the transceiver, wherein the analog to digital conversion circuitry is configured to convert the temperature signal into a digital temperature value and to store the digital temperature value in a predefined temperature location within the memory.

6. The single-chip integrated circuit of claim 5, wherein the comparison logic includes logic for comparing the digital power level value with a power level limit value, generating a power level flag value based on the comparison of the digital power level signal with the power level limit value, and storing the power level flag value in a predefined power level flag location within the memory; and the comparison logic includes logic for comparing the digital temperature value with a temperature limit value, generating a temperature flag value based on the comparison of the digital temperature signal with the temperature limit value, and storing the temperature flag value in a predefined temperature flag location within the memory.

7. The single-chip integrated circuit of claim 4, wherein the comparison logic includes logic for comparing the digital power level value with a power level limit value, generating a power level flag value based on the comparison of the digital power level signal with the power level limit value, and storing the power level flag value in a predefined power level flag location within the memory.

8. The single-chip integrated circuit of claim 1, further including:

a temperature sensor coupled to the analog to digital conversion circuitry, the temperature sensor generating a temperature signal corresponding to a temperature of the transceiver, wherein the analog to digital conversion circuitry is configured to convert the temperature signal into a digital temperature value and to store the digital temperature value in a predefined temperature location within the memory.

9. The single-chip integrated circuit of claim 8, wherein the comparison logic includes logic for comparing the digital temperature value with a temperature limit value, generating a temperature flag value based on the comparison of the digital temperature signal with the temperature limit value, and storing the temperature flag value in a predefined temperature flag location within the memory.

10. The single-chip integrated circuit of claim 1, further including fault handling logic, coupled to the transceiver for receiving at least one fault signal from the transceiver, coupled to the memory to receive at least one flag value stored in the memory, and coupled to a host interface to transmit a computed fault signal, the fault handling logic including computational logic for logically combining the at least one fault signal received from the transceiver and the at least one flag value received from the memory to generate the computed fault signal.

11. The single-chip integrated circuit of claim 1, further including control adjustment circuitry for adjusting a first control signal of the control signals generated by the control circuitry in accordance with an adjustment value stored in the memory.

12. The single-chip integrated circuit of claim 1, wherein the control circuitry generates the first control signal in accordance with a temperature.

13. The single-chip integrated circuit of claim 1, wherein the plurality of analog signals includes two analog signals selected from the set consisting of laser bias current, laser output power, and received power.

14. A single-chip integrated circuit for monitoring an optoelectronic device, comprising:

memory, including one or more memory arrays for storing information related to the optoelectronic device;

analog to digital conversion circuitry for receiving a plurality of analog signals from the optoelectronic device, the analog signals corresponding to operating conditions of the optoelectronic device, converting the received analog signal into digital values, and storing the digital values in predefined locations within the memory;

a memory interface for allowing a host to read directly from and write directly to locations within the memory in accordance with commands received from a host device;

a power supply voltage sensor coupled to the analog to digital conversion circuitry, the power supply voltage sensor generating a power level signal corresponding to a power supply voltage level of the optoelectronic device, wherein the analog to digital conversion circuitry is configured to convert the power level signal into a digital power level value and to store the digital power level value in a predefined power level location within the memory; and comparison logic for comparing the digital power level value with a power level limit value, generating a power level flag value based on the comparison of the digital power level signal with the power level limit value, and storing the power level flag value in a predefined power level flag location within the memory.

15. The single-chip integrated circuit of claim 14, further including:

a cumulative clock for generating a time value corresponding to cumulative operation time of the optoelectronic device, wherein the generated time value is readable via the memory interface.

16. The single-chip integrated circuit of claim 14, further including:

a cumulative clock for generating and storing in a register a time value corresponding to cumulative operation time of the optoelectronic device, wherein the register in which the time value is stored comprises one of the memory arrays of the memory.

17. The single-chip integrated circuit of claim 14, further including a temperature sensor coupled to the analog to digital conversion circuitry, the temperature sensor generating a temperature signal corresponding to a temperature of the optoelectronic device, wherein the analog to digital conversion circuitry is configured to convert the temperature signal into a digital temperature value and to store the digital temperature value in a predefined temperature location within the memory.

18. The single-chip integrated circuit of claim 17, wherein the comparison logic includes logic for comparing the digital temperature value with a temperature limit value, generating a temperature flag value based on the comparison of the digital temperature signal with the temperature limit value, and storing the temperature flag value in a predefined temperature flag location within the memory.

19. The single-chip integrated circuit of claim 14, further including fault handling logic, coupled to the optoelectronic device for receiving at least one fault signal from the optoelectronic device, coupled to the memory to receive at least one flag value stored in the memory, and coupled to a host interface to transmit a computed fault signal, the fault handling logic including computational logic for logically combining the at least one fault signal received from the optoelectronic device and the at least one flag value received from the memory to generate the computed fault signal.

20. The single-chip integrated circuit of claim 14, wherein the plurality of analog signals includes two analog signals selected from the set consisting of laser bias current, laser output power, and received power.

21. A single-chip integrated circuit for controlling an optoelectronic transceiver having a laser transmitter and a photodiode receiver, comprising:

analog to digital conversion circuitry for receiving a plurality of analog signals from the laser transmitter and photodiode receiver, converting the received analog signals into digital values, and storing the digital values in predefined memory mapped locations within the integrated circuit;

comparison logic for comparing the digital values with limit values to generate flag values, wherein the flag values are stored in predefined memory mapped locations within the integrated circuit during operation of the optoelectronic transceiver;

control circuitry configured to generate control signals to control operation of the laser transmitter in accordance with one or more values stored in the integrated circuit; and a memory mapped interface for allowing a host to read directly from and write directly to locations within the integrated circuit and for accessing memory mapped locations within the integrated circuit for controlling operation of the control circuitry.

22. A method of controlling an optoelectronic transceiver having a laser transmitter and a photodiode receiver, comprising:

in accordance with instructions received from a host device, enabling the host device to read directly from and write directly to locations within a memory; and receiving a plurality of analog signals from the laser transmitter and photodiode receiver, converting the received analog signals into digital values, and storing the digital values in predefined locations within the memory;

comparing the digital values with limit values to generate flag values, and storing the flag values in predefined locations within the memory during operation of the optoelectronic transceiver;

generating control signals to control operation of the laser transmitter in accordance with one or more values stored in the memory.

23. The method of claim 22, further including:

generating a time value corresponding to cumulative operation time of the transceiver, wherein the generated time value is readable by the host device via a memory interface.

24. The method of claim 22, further including:

generating and storing in a register a time value corresponding to cumulative operation time of the transceiver, wherein the register in which the time value is accessed by the reading step as a location in the memory.

25. The method of claim 22, further including:

converting an analog power supply voltage level signal, corresponding to a voltage level of the transceiver, into a digital power level value and storing the digital power level value in a predefined power level location within the memory.

26. The method of claim 25, further including:

generating a temperature signal corresponding to a temperature of the transceiver, converting the temperature signal into a digital temperature value and storing the digital temperature value in a predefined temperature location within the memory.

27. The method of claim 26, including comparing the digital power level value with a power level limit value, generating a power level flag value based on the comparison of the digital power level signal with the power level limit value, and storing the power level flag value in a predefined power level flag location within the memory; and comparing the digital temperature value with a temperature limit value, generating a temperature flag value based on the comparison of the digital temperature signal with the temperature limit value, and storing the temperature flag value in a predefined temperature flag location within the memory.

28. The method integrated circuit of claim 25, including comparing the digital power level value with a power level limit value, generating a power level flag value based on the comparison of the digital power level signal with the power level limit value, and storing the power level flag value in a predefined power level flag location within the memory.

29. The method of claim 22, further including:

generating a temperature signal corresponding to a temperature of the transceiver, converting the temperature signal into a digital temperature value and storing the digital temperature value in a predefined temperature location within the memory.

30. The method of claim 29, including:

comparing the digital temperature value with a temperature limit value, generating a temperature flag value based on the comparison of the digital temperature signal with the temperature limit value, and storing the temperature flag value in a predefined temperature flag location within the memory.

31. The method of 22, further including receiving at least one fault signal from the transceiver, receiving at least one flag value stored in the memory, logically combining the at least one fault signal received from the transceiver and the at least one flag value received from the memory to generate a computed fault signal, and transmitting the computed fault signal to the host device.

32. The method of claim 22, further including adjusting a first control signal of the control signals in accordance with an adjustment value stored in the memory.

33. The method of claim 22, wherein the method is performed by a single-chip controller integrated circuit.

34. The method of claim 22, wherein the plurality of analog signals includes two analog signals selected from the set consisting of laser bias current, laser output power, and received power.

35. A method of monitoring an optoelectronic device, comprising:

in accordance with instructions received from a host device, enabling the host device to read directly from and write directly to locations within a memory;

receiving a plurality of analog signals from the optoelectronic device, the analog signals corresponding to operating conditions of the optoelectronic device, converting the received analog signals into digital values, and storing the digital values in predefined locations within the memory;

generating a power level signal corresponding to a power supply voltage level of the optoelectronic device, converting the power level signal into a digital power level value and storing the digital power level value in a predefined power level location within the memory; and comparing the digital power level value with a power level limit value, generating a power level flag value based on the comparison of the digital power level signal with the power level limit value, and storing the power level flag value in a predefined power level flag location within the memory;

wherein the method is performed by a single-chip controller integrated circuit.

36. The method of claim 35, further including:

generating a time value corresponding to cumulative operation time of the transceiver, wherein the generated time value is readable by the host device via the memory interface.

37. The method of claim 35, further including:

generating and storing in a register a time value corresponding to cumulative operation time of the transceiver, wherein the register in which the time value is accessed by the reading step as a location in the memory.

38. The method of claim 35, further including generating a temperature signal corresponding to a temperature of the opto electronic device, converting the temperature signal into a digital temperature value and storing the digital temperature value in a predefined temperature location within the memory.

39. The method of claim 38, wherein comparing the digital temperature value with a temperature limit value, generating a temperature flag value based on the comparison of the digital temperature signal with the temperature limit value, and storing the temperature flag value in a predefined temperature flag location within the memory.

40. The method of claim 35, further including receiving at least one fault signal from the optoelectronic device, receiving at least one flag value stored in the memory, logically combining the at least one fault signal received from the optoelectronic device and the at least one flag value received from the memory to generate a computed fault signal, and transmit the computed fault signal to the host device.

41. The method of claim 35, wherein the plurality of analog signals includes two analog signals selected from the set consisting of laser bias current, laser output power, and received power.

42. A method of controlling an optoelectronic transceiver having a laser transmitter and a photodiode receiver, comprising:

in accordance with instructions received from a host device, enabling the host device to read directly from and write directly to locations within a controller of the optoelectronic transceiver;

receiving a plurality of analog signals from the laser transmitter and photodiode receiver, converting the received analog signals into digital values, and storing the digital values in predefined memory mapped locations within the controller;

comparing the digital values with limit values to generate flag values, and storing the flag values in predefined memory mapped locations within the controller during operation of the optoelectronic transceiver; and generating control signals to control operation of the laser transmitter in accordance with one or more values stored in the predefined memory mapped locations within the controller.

43. The method of claim 42, further including:

generating and storing in a register a time value corresponding to cumulative operation time of the transceiver, wherein the register in which the time value is accessed by the reading step as a memory mapped within the controller.

44. A single-chip integrated circuit for monitoring an optoelectronic device, comprising:

memory, including one or more memory arrays for storing information related to the optoelectronic device;

analog to digital conversion circuitry for receiving a plurality of analog signals from the optoelectronic device, the analog signals corresponding to operating conditions of the optoelectronic device, converting the received analog signal into digital values, and storing the digital values in predefined locations within the memory;

a memory interface for allowing a host to read directly from and write directly to locations within the memory in accordance with commands received from a host device;

a temperature sensor coupled to the analog to digital conversion circuitry, the temperature sensor generating a temperature signal corresponding to a temperature of the optoelectronic device, wherein the analog to digital conversion circuitry is configured to convert the temperature signal into a digital temperature value and to store the digital temperature value in a predefined temperature location within the memory; and comparison logic for comparing the digital temperature value with a temperature limit value, generating a temperature flag value based on the comparison of the digital temperature signal with the temperature limit value, and storing the temperature flag value in a predefined temperature flag location within the memory.

45. A method of monitoring an optoelectronic device, comprising:

in accordance with instructions received from a host device, enabling the host device to read directly from and write directly to locations within a memory;

receiving a plurality of analog signals from the optoelectronic device, the analog signals corresponding to operating conditions of the optoelectronic device, converting the received analog signals into digital values, and storing the digital values in predefined locations within the memory;

generating a temperature signal corresponding to a temperature of the optoelectronic device, converting the temperature signal into a digital temperature value and storing the digital temperature value in a predefined temperature location within the memory; and comparing the temperature value with a temperature limit value, generating a temperature flag value based on the comparison of the digital temperature signal with the temperature limit value, and storing the temperature flag value in a predefined temperature flag location within the memory;

wherein the method is performed by a single-chip controller integrated circuit.

46. Circuitry for monitoring an optoelectronic device, comprising: memory, including one or more memory arrays for storing information related to the optoelectronic device;

analog to digital conversion circuitry configured to receive a plurality of analog signals from the optoelectronic device, the analog signals corresponding to operating conditions of the optoelectronic device, convert the received analog signals into digital values, and store the digital values in predefined locations within the memory;

comparison logic configured to compare the digital values to generate flag values, wherein the flag values are stored in predefined flag storage locations within the memory during operation of the optoelectronic device; and an interface configured to enable a host to read from host-specified locations within the memory, including the predefined flag storage locations, in accordance with commands received from the host.

47. The circuitry of claim 46, wherein the analog to digital conversion circuitry is configured to convert a power level signal into a digital power level value and to store the digital power level value in a predefined power level location within the memory.

48. The circuitry of claim 46, wherein the comparison logic includes logic for comparing the digital power level value with a power limit value, generating a power flag value based on the comparison of the digital power signal with the power limit value, and storing the power flag value in a predefined power flage location within the memory.

49. The circuitry of claim 46, wherein the analog to digital conversion circuitry is configured to convert a temperature signal into a digital temperature value and to store the digital temperature value in a predetermined temperature location within the memory.

50. The circuitry of claim 47, wherein the comparison logic includes logic for comparing the digital temperature value with a temperature limit value, generating a temperature flag value based on the comparison of the digital temperature signal with the temperature limit value, and storing the temperature flag value in a temperature flag value in a predefined flag location within the memory.

51. The circuitry of claim 46, wherein the plurality of analog signals includes two analog signals selected from the set consisting of laser bias current, laser output power, and received power.

52. The circuitry of claim 46, wherein the analog to digital conversion circuitry is configured to receive a voltage signal from a source external to the monitoring circuitry, convert the voltage signal into a digital voltage value and store the digital voltage value in a respective predefined location within the memory.

53. Circuitry for monitoring an optoelectronic device, comprising:

memory, including one or more memory arrays for storing information related to the optoelectronic device;

analog to digital conversion circuitry configured to receive a plurality of analog signals from the optoelectronic device, the analog signals corresponding to operating condition of the optoelectronic device, convert the received analog signals into digital values, and store the digital values in predefined locations within the memory;

comparison logic configured to compare the digital values with limit values to generate flag values, wherein the flag values are stored in predefined flag storage locations within the memory during operation of the optoelectronic device; and an interface configured to enable a host to read from host-specified locations within the memory, including the predefined flag storage locations, in accordance with commands received from the host;

wherein the plurality of analog signals include laser bias current, laser output power, and received power.

54. A method of monitoring an optoelectronic device, comprising:

receiving a plurality of analog signals from the optoelectronic device, the analog signals corresponding to operating conditions of the optoelectronic device, converting the received analog signals into digital values, and storing the digital values in predefined locations within a memory;

comparing the digital values with limit values to generate flag values, and storing the flag values in predefined flag locations within the memory; and in accordance with instructions received from a host device, enabling the host device to read from host-specified locations within the memory, including the predefined flag locations.

55. The method of claim 54, further including:

generating a power level signal corresponding to a power supply voltage level of the optoelectronic device, converting the power level signal into a digital power level value and storing the digital power level value in a predefined power level location within the memory.

56. The method of claim 55, further including:

comparing the digital powe level value with a power level limit value, generating a power level flag value based on the comparison of the digital power level signal with the power level limit value, and storing the power level flag value in a predefined power level flag location within the memory.

57. The method of claim 54, further including generating a temperature signal corresponding a temperature of the optoelectronic device, converting the temperature signal into a digital temperature value and storing the digital temperature value in a predefined temperature location within the memory.

58. The method of claim 57, wherein comparing the digital temperature value with a temperature limit value, generating a temperature flag value based on the comparison of the digital temperature signal with the temperature limit value, and storing the temperature flag value in a predefined temperature flag location within the memory.

59. The method of claim 54, wherein the plurality of analog signals includes two analog signals selected from the set consisting of laser bias current, laser output power, and received power.

60. The method of claim 54, including receiving a voltage signal from a source external to the optoelectronic device, converting the voltage signal into a digital voltage value and storing the digital voltage valu in a respective predefined location within the memory.

61. A method of monitoring an optoelectronic device, comprising:

receiving a plurality of analog signals from the optoelectronic device, the analog signals corresponding to operating conditions of the optoelectronic device, converting the received analog signals into digital values, and storing the digital values in predefined locations within a memory.

comparing the digital values with limit values to generate flag values, and storing the flag values in predefined flag locations within the memory; and in accordance with instructions received from a host device, enabling the host device to read from host-specified locations within the memory, including the predefined flag locations;

wherein the plurality of analog signals includes laser bias current, laser output power, and received power.

62. Circuitry for monitoring an optoelectronic device, comprising:

analog to digital conversion circuitry configured to receive a plurality of analog signals from the optoelectronic device, the analog signals corresponding to operating conditions of the optoelectronic device, convert the received analog signals into digital values, and store the digital values in predefined memory-mapped locations within the optoelectronic device;

comparison logic configured to compare the digital values with limit values to generate flag values, wherein the flag values are stored in predefined memory-mapped flag storage locations within the optoelectronic device during operation of the optoelectronic device; and an interface configured to enable a host to read from host to read from host-specified memory-mapped locations within the optoelectronic device, including the predefined memory-mapped flag storage locations.

63. The circuitry of claim 62, wherein the analog to digital conversion circuitry is configured to convert a power level signal into a digital power level value and to store the digital power level value in a predefined memory-mapped power level location within the optoelectronic device.

64. The circuitry of claim 63, wherein the comparison logic includes logic for comparing the digital power level value with a power limit value, and storing the power flag value in a predefined memory-mapped power flag location within the optoelectronic device.

65. The circuitry of claim 62, wherein the analog to digital conversion circuitry is configured to convert a temperature signal into a digital temperature value and to store the digital temperature value in a predefined memory-mapped temperature location within the optoelectronic device.

66. The circuitry of claim 65, wherein the comparison logic includes logic for comparing the digital temperature value with a temperature limit value, generating a temperature flag value based on the comparison of the digital temperature signal with the temperature limit value, and storing the temperature flag value in a predefined memory-mapped temperature flag location within the optoelectronic device.

67. The circuitry of claim 62, wherein the plurality of analog signals includes two analog signals selected from the set consisting of laser bias current, laser output power, and received power.

68. The circuitry of claim 62, wherein the analog to digital conversion circuitry is configured to receive a voltage signal from a source external to the monitoring circuitry, convert the voltage signal into a digital voltage value and store the digital voltage value in a respective predefined memory-mapped location within the optoelectronic device.

69. Circuitry for monitoring an optoelectronic device, comprising:

analog to digital conversion circuitry configured to receive a plurality of analog signals from the optoelectronic device, the analog signals corresponding to operating conditions of the optoelectronic device, convert the received analog signals into digital values, and store the digital values in predefined memory-mapped locations within the optoelectronic device;

comparison logic configured to compare the digital values with limit values to generate flag values, wherein the flag value are stored in predefined memory-mapped flag storage locations within the optoelectronic device during operation of the optoelectronic device; and an interface configured to enable a host to read from host-specified memory-mapped locations within the optoelectronic device, including the predefined memory-mapped flag storage locations, in accordance with commands received from the host;

wherein the plurality of analog signals include laser bias output power, and receive power.

70. A method of monitoring an optoelectronic device, comprising: 'receiving a plurality of analog signals from the optoelectronic device, the analog signals corresponding to operating conditions of the optoelectronic device, converting the received analog signals into digital values, and storing the digital values in predefined memory-mapped locations within the optoelectronic device;

comparing the digital values with limit values to generate flag values, and storing the flag values in predefined memory-mapped flag locations within the optoelectronic device; and in accordance with instructions received from a host device, enabling the host device to read from host-specified memory-mapped locations within the optoelectronic device, including the predefined memory-mapped flag locations.

71. The method of claim 70, further including:

generating a power level signal corresponding to a power supply voltage level of the optoelectronic device, converting the power level signal into a digital power level value and storing the digital power level value in a predefined memory-mapped power level location within the optoelectronic device.

72. The method of claim 71, further including:

comparing the digital powe level value with a power level limit value, generating a power level flag value based on the comparison of the digital power level signal with the power level limit value, and storing the power level flag value in a predefined memory-mapped power level flag location within the optoelectronic device.

73. The method of claim 70, further including generating a temperature signal corresponding to a temperature of the optoelectronic device, converting the temperature signal into a digital temperature value and storing the digital temperature value in a predefined memory-mapped temperature location within the optoelectronic device.

74. The method of claim 73, wherein comparing the digital temperature value with a temperature limit value, generating a temperature flag value based on the comparison of the digital temperature signal with the temperature limit value, and storing the temperature flag value in a predefined memory-mapped temperature flag loaction within the optoelectronic device.

75. The method of claim 70, wherein the plurality of analog signals includes two analog signals selected from the set consisting of laser bias current, laser output power, and received power.

76. The method of claim 70, including receiving a voltage signal from a source external to the optoelectronic device, converting the voltage signal into a digital voltage value and storing the digital voltage value in a respective predefined memory-mapped location within the optoelectronic device.

77. A method of monitoring an optoelectronic device, comprising;

receiving a plurality of analog from the optoelectronic device, the analog signals corresponding to operating conditions of the optoelectronic device, converting the received analog signals into digital values, and storing the digital values in predefined memory-mapped locations within the optoelectronic device;

comparing the digital values with limit values to generate flag values, and storing the flag values in predefined memory-mapped flag locations with the optoelectronic device; and in accordance with instructions received from a host device, enabling the host device to read from host-specified memory-mapped locations within the optoelectronic device, including the predefined memory-mapped flag locations;

wherein the plurality of analog signals includes laser bias current, laser output power, and received power.

* * * * *

UNITED STATES PATENT AND TRADEMARK OFFICE
CERTIFICATE OF CORRECTION

| | | |
|---|---|---|
| PATENT NO. | : 7,079,775 B2 | |
| APPLICATION NO. | : 09/777917 | |
| DATED | : July 18, 2006 | |
| INVENTOR(S) | : Aronson et al. | |

It is certified that error appears in the above-identified patent and that said Letters Patent is hereby corrected as shown below:

Title page, item (75), please replace "Stephen G. Hosking" with -- Lucy G. Hosking --;

Signed and Sealed this

Eighth Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 7,079,775 B2 Page 1 of 1
APPLICATION NO. : 09/777917
DATED : July 18, 2006
INVENTOR(S) : Aronson et al.

It is certified that error appears in the above-identified patent and that said Letters Patent is hereby corrected as shown below:

Column 25, Claim 62, Line 25, delete "to read from host"

Signed and Sealed this

Fifteenth Day of July, 2008

JON W. DUDAS
*Director of the United States Patent and Trademark Office*